(12) United States Patent
Guo et al.

(10) Patent No.: US 10,922,263 B2
(45) Date of Patent: Feb. 16, 2021

(54) SERIAL COMMUNICATION DEVICE

(71) Applicant: C-SKY Microsystems Co., Ltd., Hangzhou, Zhejiang (CN)

(72) Inventors: Mingkun Guo, Hangzhou (CN); Jianyi Meng, Hangzhou (CN); Wei Qiu, Hangzhou (CN); Jun Yang, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 0 days.

(21) Appl. No.: 16/479,565

(22) PCT Filed: Dec. 21, 2018

(86) PCT No.: PCT/CN2018/122617
§ 371 (c)(1),
(2) Date: Jul. 19, 2019

(87) PCT Pub. No.: WO2019/120282
PCT Pub. Date: Jun. 27, 2019

(65) Prior Publication Data
US 2019/0384741 A1    Dec. 19, 2019

(30) Foreign Application Priority Data
Dec. 21, 2017 (CN) .......................... 2017 1 1395761

(51) Int. Cl.
*G06F 13/42* (2006.01)
*G06F 13/40* (2006.01)
(Continued)

(52) U.S. Cl.
CPC .......... *G06F 13/4282* (2013.01); *G06F 13/24* (2013.01); *G06F 13/382* (2013.01);
(Continued)

(58) Field of Classification Search
None
See application file for complete search history.

(56) References Cited

U.S. PATENT DOCUMENTS
2016/0224490 A1    8/2016    Danis et al.

FOREIGN PATENT DOCUMENTS
CN    201556201 U    8/2010
CN    102231143 A    11/2011
(Continued)

OTHER PUBLICATIONS

International Search Report and Written Opinion issued in related International Application No. PCT/CN2018/122617, dated Mar. 20, 2019 (7 pgs.).
(Continued)

*Primary Examiner* — Idriss N Alrobaye
*Assistant Examiner* — Dayton Lewis-Taylor
(74) *Attorney, Agent, or Firm* — Finnegan, Henderson, Farabow, Garrett & Dunner LLP

(57) ABSTRACT

The present disclosure provides a serial communication device. The device includes: a first interface module communicatively coupled to an advanced bus of a master machine, a second interface module communicatively coupled to a data interface of a slave machine, a control module, a transceiving enable module, a shift register module and an interrupt generating module. The shift register module acquires through the first interface module data to write that is sent by a master machine, and serially shifts out the data to write when a shift enable signal is valid, the serial data that is shifted out being sent to a slave machine through the second interface module; and the shift register module acquires through the second interface module serial data that is uploaded by the slave machine, serially shifts in the serial data when the shift enable signal is valid, and obtains data (Continued)

to read according to the serial data that is shifted in, the data to read being uploaded to the master machine through the first interface module. The present disclosure can save resources consumed during serial communication of the master machine.

26 Claims, 6 Drawing Sheets

(51) Int. Cl.
  *G06F 13/24* (2006.01)
  *G06F 13/38* (2006.01)
(52) U.S. Cl.
  CPC ...... *G06F 13/4022* (2013.01); *G06F 13/4068* (2013.01); *G06F 2213/0002* (2013.01)

(56) References Cited

FOREIGN PATENT DOCUMENTS

| | | |
|---|---|---|
| CN | 102253913 A | 11/2011 |
| CN | 104809094 A | 7/2015 |
| CN | 108052473 A | 5/2018 |
| KR | 19990059501 | 7/1999 |

OTHER PUBLICATIONS

Supplementary Chinese Search Report issued in corresponding Chinese Application No. 201711395761.1 dated Oct. 23, 2019 (1 page).
First Chinese Office Action issued in Chinese Application No. 201711395761.1 dated Apr. 30, 2019, 10 pages.

SERIAL COMMUNICATION DEVICE

CROSS REFERENCE TO RELATED APPLICATIONS

This application is a national stage filing under 35 U.S.C. 371 of International Application No. PCT/CN2018/122617 filed on Dec. 21, 2018, and published as WO 2019/120282 A1, which claims the benefits of priority to Chinese application number 201711395761.1, filed Dec. 21, 2017, both of which are incorporated herein by reference in their entireties.

BACKGROUND

Serial communication is a communication mode widely used and broadly applied in such instances as computer peripherals and industrial control. During serial communication, the serial data input of a peripheral device can be received and converted into the parallel data required in a computer, or parallel data in the computer can be converted into serial data and sent to the peripheral device. Using serial communication is a cost-effective design scheme for a device with low requirements for the data transmission rate.

SUMMARY OF DISCLOSURE

The present disclosure provides a serial communication device. A master machine does not need to consume a large amount of resources when communicating with a slave machine through the serial communication device.

The present disclosure provides a serial communication device, configured to implement data transmission between a master machine and a slave machine, including a first interface module connected to an advanced bus of the master machine, an second interface module connected to a data interface of the slave machine, a control module configured to acquire through the first interface module control information, a transceiving enable module configured to generate a shift enable signal according to the control signal, a shift register module configured to acquire through the first interface module data to write, and an interrupt generating module configured to generate an interrupt request signal.

DETAILED DESCRIPTION

To make the objectives, technical solutions and advantages of the embodiments of the present disclosure much clearer, the technical solutions in the embodiments of the present disclosure are described in the following with reference to the accompanying drawings in the embodiments of the present disclosure. It is apparent that the embodiments described are merely some of rather than all the embodiments of the present disclosure. Based on the embodiments in the present disclosure, all other embodiments obtained by those with ordinary skill in the art without creative efforts should all fall within the scope of protection of the present disclosure.

In conventional systems, a master machine can write a level in the general purpose input output (GPIO) or read the level of the GPIO through a bus, thereby implementing serial communication. In these conventional systems, the master machine must implement serial communication through the GPIO by sending/receiving an interrupt. A serial communication device may frequently initiate an interrupt request to the master machine, and then the master machine frequently writes or reads serial data in a bitwise manner in response to the interrupt request. A large amount of master machine resources needs to be consumed in this process.

Figure 1:
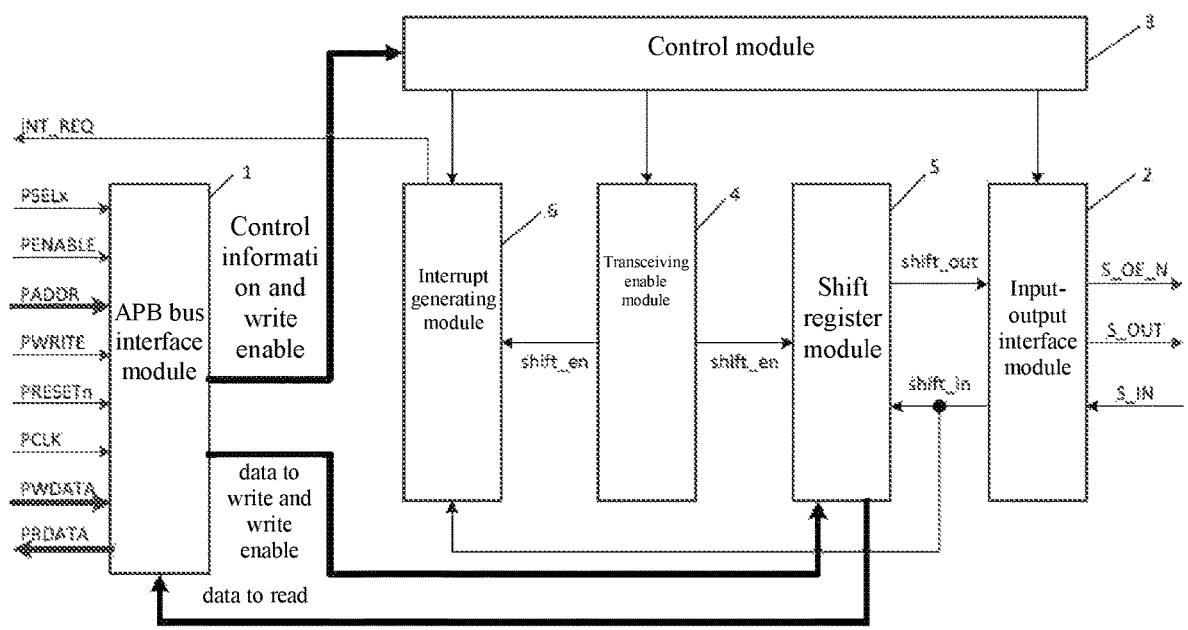
FIG. 1 is a schematic diagram of an exemplary serial communication device, according to some embodiments of the present disclosure.

Embodiments of the present disclosure can receive or send serial data without frequent interrupts, hence saving resources consumed during serial communication of the master machine. Some embodiments of the present disclosure provide a serial communication device configured to implement data transmission between a master machine and a slave machine. FIG. 1 is a schematic diagram of the serial communication device, according to some embodiments. As shown in FIG. 1, the device includes: Advanced Peripheral Bus (APB) interface module 1, input-output interface module 2, control module 3, transceiving enable module 4, shift register module 5, and interrupt generating module 6.

APB interface module 1 is connected to an APB of the master machine and is responsible for communicating with an APB master machine.

Input-output interface module 2 is connected to a data interface of the slave machine and is responsible for communicating with the slave machine.

Control module 3 acquires through APB interface module 1 control information sent by the master machine and outputs control signals.

Transceiving enable module 4 generates a shift enable signal according to the control signals.

Shift register module 5 acquires through APB interface module 1 data to be written (hereinafter referred to as "write data") and a write enable signal from the master machine. Moreover, shift register module 5 acquires a shift enable signal from transceiving enable module 4. When the write enable signal is at a high level, shift register module 5 writes the write data in parallel. When the write enable signal is at a low level and the shift enable signal is at a high level, shift register module 5 serially shifts out the data and sends the serial data that is shifted out to the slave machine through input-output interface module 2. In addition, shift register module 5 acquires through input-output interface module 2 serial data uploaded by the slave machine, serially shifts in the serial data when the shift enable signal is valid, and obtains data to be read (hereinafter referred to as "read data") according to the serial data that is shifted in, the data to read being uploaded to the master machine through APB interface module 1.

Interrupt generating module 6 generates an interrupt request signal according to the control signal, the shift enable signal and the serial data that is shifted in by shift register module 5. Once generated, interrupt generating module 6 sends the interrupt request signal INT_REQ to the master machine and notifies the master machine to resend the control information.

In some embodiments, APB interface module 1 has all signal lines defined by an APB. During idle times, a select signal PSEL and an enable signal PENABLE are both low, and data PDATA and an address PADDR are invalid.

Figure 2:
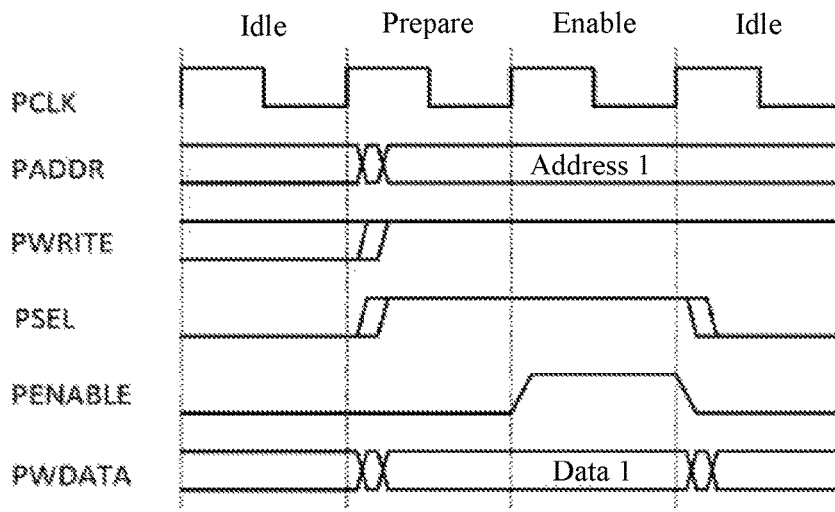
FIG. 2 is an exemplary timing diagram of writing data by an advanced bus, according to some embodiments of the present disclosure.

FIG. 2 is an exemplary timing diagram of writing data by an advanced bus, according to some embodiments of the present disclosure. In a preparation cycle, the master machine prepares the data PWDATA and the address PADDR and sets the select signal PSEL to high at the same time. In an enable cycle, the master machine sets the enable signal PENABLE to high. These signals remain high at a rising edge at the end of the enable cycle. At this rising edge, the data is written in a corresponding register according to the address.

Figure 3:
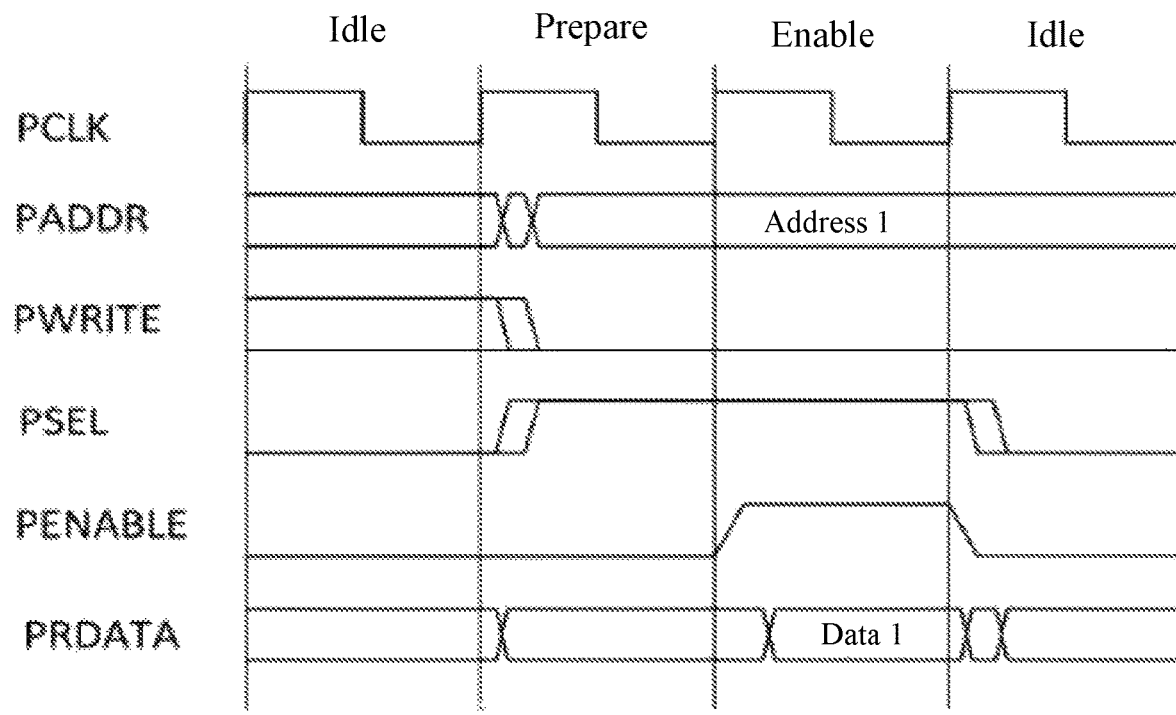
FIG. 3 is an exemplary timing diagram of reading data by an advanced bus, according to some embodiments of the disclosure.

FIG. 3 is an exemplary timing diagram of reading data by an advanced bus, according to some embodiments of the disclosure. In a preparation cycle, the master machine prepares an address PADDR and sets a select signal PSEL to high. In an enable cycle, the master machine sets an enable signal PENABLE to high, and at the same time the APB interface module prepares data PRDATA according to the address. These signals remain high at a rising edge at the end of the enable cycle. At this rising edge, the master machine reads the data.

Figure 4:
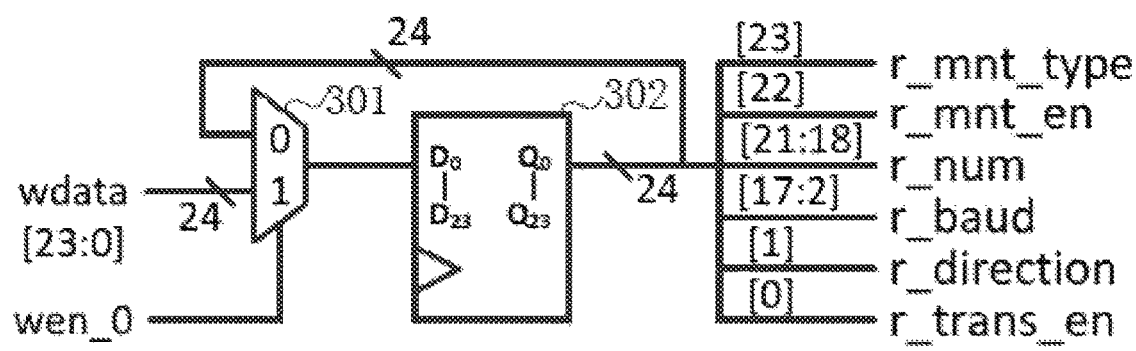
FIG. 4 is a schematic diagram of an exemplary circuit structure of a control module, according to some embodiments of the present disclosure.

FIG. 4 is a schematic diagram of an exemplary circuit structure of control module 3, according to some embodiments of the present disclosure. As shown in FIG. 4, control module 3 includes multiplexer 301 and register 302. The first input end of multiplexer 301 inputs 24-bit control information wdata[23:0]. The control end of multiplexer 301 inputs a write enable signal wen_O from control module 3. The output end of multiplexer 301 is connected to the input end of register 302. The output end of register 302 is connected to the second input end of multiplexer 301. When wen_0 is valid, e.g., wen_0 is equal to 1, the control information wdata[23:0] is written into register 302. The output end of register 302 outputs a control signal. The control signal includes a transmission enable signal r_trans_en, a transmission direction signal r_direction, a baud rate signal r_baud, a transmission length signal r_num, a monitoring enable signal r_mnt_en, and a monitoring type signal r_mnt_type.

The transmission enable signal r_trans_en enables sending or receiving of serial data when the transmission enable signal is at a high level.

The transmission direction signal r_direction indicates receiving data when the transmission direction signal is at a high level and indicates sending data when the transmission direction signal is at a low level.

The baud rate signal r_baud indicates the baud rate at which data is sent or received.

The transmission length signal r_num indicates the number of bits of data sent or received.

The monitoring enable signal r_mnt_en enables monitoring a changing edge of a serially inputted data signal when the monitoring enable signal is at a high level.

The monitoring type signal r_mnt_type indicates detection of a falling edge of a serially inputted data signal when the monitoring type signal is at a high level, and indicates detection of a rising edge of the serially inputted data signal when the monitoring type signal is at a low level.

Figure 5:
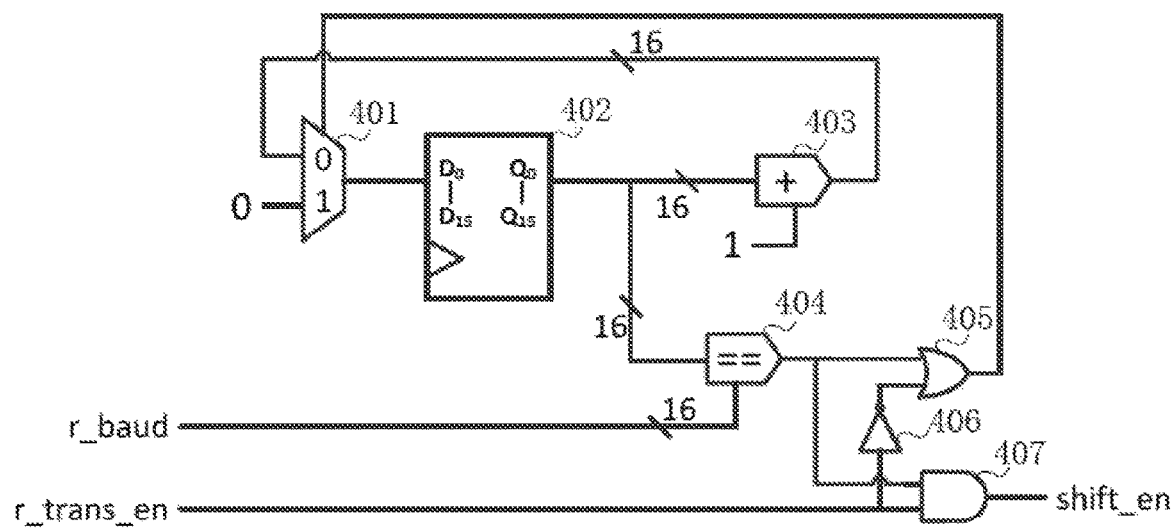
FIG. 5 is a schematic diagram of exemplary circuitry of a transceiving enable module, according to some embodiments of the present disclosure.

In some embodiments, transceiving enable module 4 generates a shift enable signal shift_en according to the transmission enable signal r_trans_en and the baud rate signal r_baud. FIG. 5 is a schematic diagram of an exemplary circuitry of transceiving enable module 4, according to some embodiments of the present disclosure. As shown in FIG. 5, transceiving enable module 4 includes multiplexer 401, register 402, adder 403, comparator 404, OR gate 405, inverter 406 and AND gate 407. The first input end of multiplexer 401 inputs a low-level signal. The output end of multiplexer 401 is connected to the input end of register 402. The output end of register 402 is connected to the first input end of adder 403 and the first input end of comparator 404 respectively. The second input end of adder 403 inputs a value 1. The output end of adder 403 is connected to the second input end of multiplexer 401. The second input end of comparator 404 inputs the baud rate signal r_baud. The output end of comparator 404 is connected to the first input end of OR gate 405 and the first input end of AND gate 407, respectively. The transmission enable signal r_trans_en is directly inputted into the second input end of AND gate 407. At the same time, the transmission enable signal r_trans_en is inverted by inverter 406 and then inputted into the second input end of OR gate 405. The output end of OR gate 405 is connected to the control end of multiplexer 401. The output end of AND gate 407 is connected to the shift enable signal shift_en.

Transceiving enable module 4 can generate the shift enable signal shift_en according to a set baud rate. When the transmission enable signal r_trans_en is at a high level, the value of register 402 is increased at a clock rising edge. When the value of register 402 is equal to the value of the baud rate signal r_baud, the shift enable signal shift_en is set to high. Register 402 is reset at a next clock rising edge and starts timing again.

Figure 6:
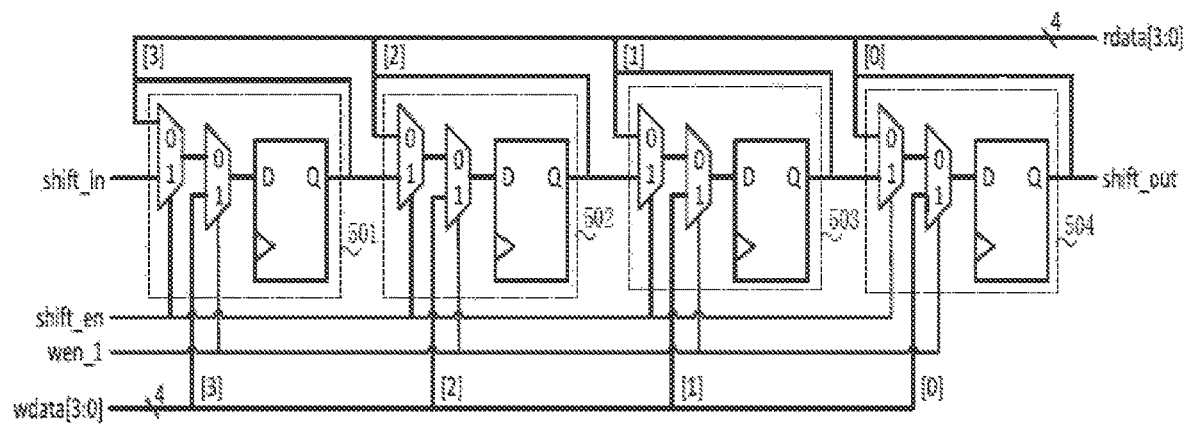
FIG. 6 a schematic diagram of exemplary circuitry of a shift register module, according to some embodiments of the present disclosure.

FIG. 6 a schematic diagram of an exemplary circuitry of shift register module 5, according to some embodiments of the present disclosure. As shown in FIG. 6, shift register module 5 includes four shift submodules 501 to 504. The number of the shift submodules depends on the number of bits of parallel data during communication with the master machine, that is, the number of bits of write data or the number of bits of read data. The shift submodules are of the same structure, and each includes a first multiplexer, a second multiplexer and a D flip-flop. The output end of the first multiplexer is connected to the second input end of the second multiplexer. The output end of the second multiplexer is connected to the input end of the D flip-flop. The output end of the D flip-flop is connected to the second input end of the first multiplexer. The first input end of the first multiplexer serves as the first input end of the shift submodule. The control end of the first multiplexer serves as the first control end of the shift submodule. The first input end of the second multiplexer serves as the second input end of the shift submodule. The control end of the second multiplexer serves as the second control end of the shift submodule. The output end of the D flip-flop serves as the output end of the shift submodule.

Shift submodules 501 to 504 are connected in series sequentially. The first input end of submodule 501 receives serial data shift_in. The output end of submodule 501 is connected to the first input end of submodule 502. The output end of submodule 502 is connected to the first input end of submodule 503. The output end of submodule 503 is connected to the first input end of submodule 504. The output end of submodule 504 outputs shifted-out serial data shift_out. The control ends of the first multiplexers of submodule 501 to submodule 504 receive a shift enable signal shift_en. The control ends of the second multiplexers of submodule 501 to submodule 504 receive a write enable signal wen_1 of the shift register module. The input ends of the second multiplexers of submodule 501 to submodule 504 receive one-bit data of four-bit write data wdata[3:0] respectively, where the first input end receives bit wdata[3], the second input end receives bit wdata[2], the third input end receives bit wdata[1], and the fourth input end receives bit wdata[0]. Each of the output ends of submodule 501 to submodule 504 output one-bit data of four-bit read data rdata[3:0] respectively, where the first output end outputs bit rdata[3], the second output end outputs bit rdata[2], the third output end outputs bit rdata[1], and the fourth output end outputs bit rdata[0].

For example, when the master machine writes data into the slave machine and when wen_1 is valid, e.g., wen_1 is equal to 1, shift register module 5 selects the four-bit data to write wdata[3:0] as an input of each D flip-flop. When wen_1 is invalid and the shift enable signal shift_en is valid, e.g., wen_1 is equal to 0 and shift_en is equal to 1, shift register module 5 serially shifts out the parallel data. In another example, when the master machine reads the data stored in the slave machine and when the shift enable signal shift_en is valid, e.g., shift_en is equal to 1, shift register module 5 sequentially shifts the serial data shift_in into each D flip-flop. The master machine acquires parallel data by reading the read data rdata[3:0].

In some embodiments, interrupt generating module 6 generates an interrupt request signal when a set of conditions are met in the data transmission process, so as to notify the master machine to resend the control information. For example, interrupt generating module 6 generates a transmission interrupt request signal when the number of bits of the serial data that is shifted in or shifted out by shift register module 5 reaches a set transmission length, or generates a monitoring interrupt request signal when the serial data that is shifted in by shift register module 5 has met a set of changing edge.

Figure 7:
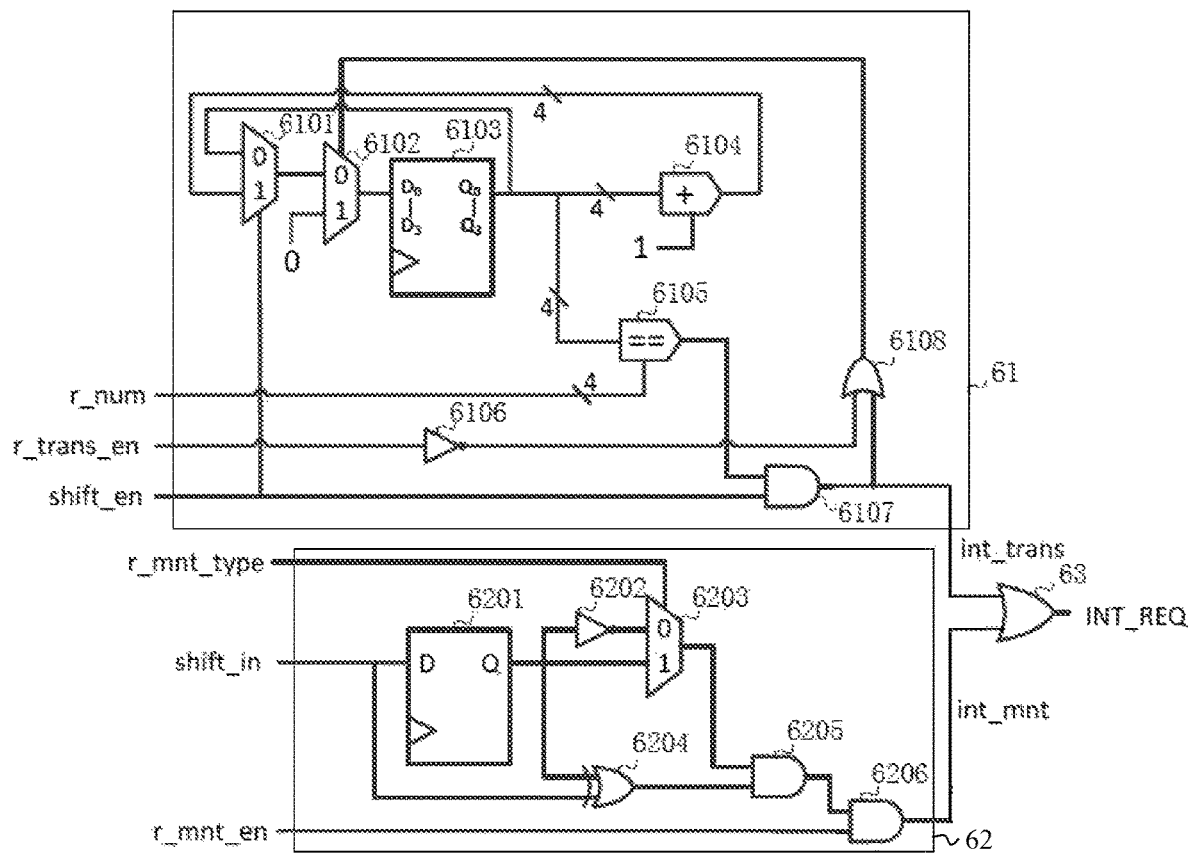
FIG. 7 is a schematic diagram of exemplary circuitry of an interrupt generating module, according to some embodiments of the present disclosure.

FIG. 7 is a schematic diagram of exemplary circuitry of an interrupt generating module, according to some embodiments of the present disclosure. The module is divided into two circuit units 61 and 62. Circuit unit 61 generates a transmission interrupt request signal int_trans. Circuit unit 62 generates a monitoring interrupt request signal int_mnt, and the two interrupt request signals (int_trans and int_mnt) are inputted as signal INT_REQ to the master machine after an OR operation is performed on them by OR gate 63.

Circuit unit 61 generates a transmission interrupt request signal int_trans according to the transmission enable signal r_trans_en, the shift enable signal shift_en, and the transmission length signal r_num. Circuit unit 61 comprises multiplexer 6101, multiplexer 6102, register 6103, adder 6104, comparator 6105, inverter 6106, AND gate 6107, and OR gate 6108.

The output end of multiplexer 6101 is connected to the second input end of multiplexer 6102. The first input end of multiplexer 6102 receives a low-level signal. The output end of multiplexer 6102 is connected to the input end of register 6103. The output end of register 6103 is connected to the second input end of multiplexer 6101. The output end of register 6103 is further connected to the first input end of adder 6104 and the first input end of comparator 6105. The second input end of adder 6104 receives a high-level signal, e.g., value 1. The output end of adder 6104 is connected to the first input end of multiplexer 6101. The second input end of comparator 6105 receives the transmission length signal r_num. The output end of comparator 6105 is connected to the first input end of AND gate 6107. The transmission enable signal r_trans_en is inverted by inverter 6106 and then inputted into the first input end of OR gate 6108. The shift enable signal shift_en is inputted into the second input end of AND gate 6107. The output end of AND gate 6107 is connected to the second input end of OR gate 6108. The output end of OR gate 6108 is connected to the control end of multiplexer 6102. The transmission interrupt request signal int_trans is obtained at the output end of AND gate 6107.

In circuit unit 61, the value of register 6103 is increased at a clock rising edge when the shift enable signal shift_en is at a high level. When the value in register 6103 is equal to the value of the transmission length signal r_num, the transmission interrupt request signal int_trans is set to high, and register 6103 is reset at a next clock rising edge.

Circuit unit 62 generates a monitoring interrupt request signal int_mnt according to the monitoring enable signal r_mnt_en, the monitoring type signal r_mnt_type and the serial data shift_in shifted in by shift register module 5. Circuit unit 62 includes: D flip-flop 6201, inverter 6202, multiplexer 6203, exclusive-OR gate 6204, AND gate 6205, and AND gate 6206.

The shift_in signal is inputted to the input end of D flip-flop 6201 and the second input end of exclusive-OR gate 6204. The output end of D flip-flop 6201 is connected to the input end of inverter 6202, the first input end of multiplexer 6203, and the first input end of exclusive-OR gate 6204. The output end of inverter 6202 is connected to the second input end of multiplexer 6203. The control end of multiplexer 6203 is connected to the monitoring type signal r_mnt_type. The output end of multiplexer 6203 is connected to the first input end of AND gate 6205. The output end of exclusive-OR gate 6204 is connected to the second input end of AND gate 6205. The output end of AND gate 6205 is connected to the first input end of AND gate 6206. The second input end of AND gate 6206 is connected to the monitoring enable signal r_mnt_en. The monitoring interrupt request signal int_mnt is obtained at the output end of AND gate 6206.

In circuit unit 62, when the monitoring enable signal r_mnt_en is valid, a changing edge of the serial data shift_in is monitored. When the monitoring type signal r_mnt_type is at a high level, a falling edge of the shift_in is monitored. When the monitoring type signal r_mnt_type is at a low level, a rising edge of the shift_in is monitored. If a corresponding changing edge has been detected, the monitoring interrupt request signal int_mnt is set to high.

In some embodiments, input-output interface module 2 outputs the serial data shift_out to the slave machine and obtains according to the serial data uploaded by the slave machine the serial data shift_in that is shifted in by shift register module 5. Input-output interface module 2 further transmits an output enable signal indicating the validity of the serially output data.

Figure 8:
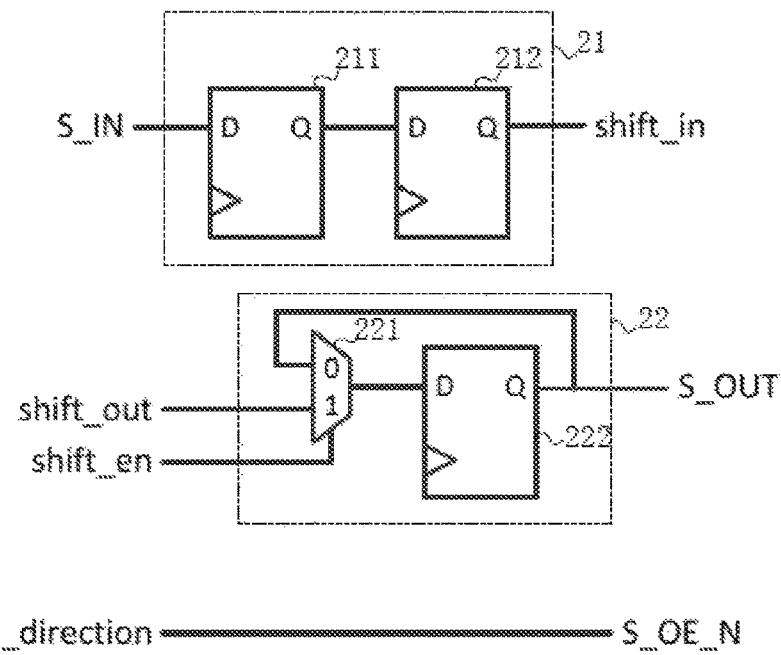
FIG. 8 is a schematic diagram of exemplary circuitry of an input-output interface module, according to some embodiments of the present disclosure.

FIG. 8 is a schematic diagram of an exemplary circuitry of input-output interface module 2, according to some embodiments of the present disclosure. As shown in FIG. 8, input-output interface module 2 includes input unit 21 and output unit 22.

Input unit 21 adopts a synchronizer formed by cascading two D flip-flops 211 and 212. The input end of D flip-flop 211 inputs serial data S_IN uploaded by the slave machine. D flip-flop 212 outputs the serial data shift_in. When the data is received, S_IN is synchronized to a local clock through the synchronizer to generate serial data shift_in.

Output unit 22 includes multiplexer 221 and D flip-flop 222. The first input end of multiplexer 221 inputs the serial data shift_out. The control end of multiplexer 221 receives the shift enable signal shift_en. The output end of multiplexer 221 is connected to the input end of D flip-flop 222. The output end of D flip-flop 222 is connected to the second input end of multiplexer 221. The output end of D flip-flop 222 outputs serial data S_OUT sent to the slave machine. When the shift enable signal shift_en is at a high level, the serial data shift_out is outputted through output unit 22.

In some embodiments, input-output interface module 2 further includes an output enable signal line for transmitting an output enable signal S_OE_N. The output enable signal S_OE_N is obtained according to the transmission direction signal r_direction. The output enable signal S_OE_N is at a low level when the transmission direction signal r_direction is at a high level, indicating receiving data. The output enable signal S_OE_N is at a high level when the transmission direction signal r_direction is at a low level, indicating sending data.

In summary, according to the serial communication device provided in the embodiments of the present disclosure, a transceiving enable module generates a shift enable signal under the action of a control module. A shift register module controlled by the shift enable signal shifts in or shifts out serial data. When set conditions are met an interrupt generating module generates an interrupt to change the state of data transmission. Compared with the conventional systems, the present disclosure can receive or send serial data without frequent interrupts, thereby saving the resources of a master machine. At the same time, data transmission is performed according to a set baud rate, and thus the rate of sending or receiving data can be controlled.

Figure 9:
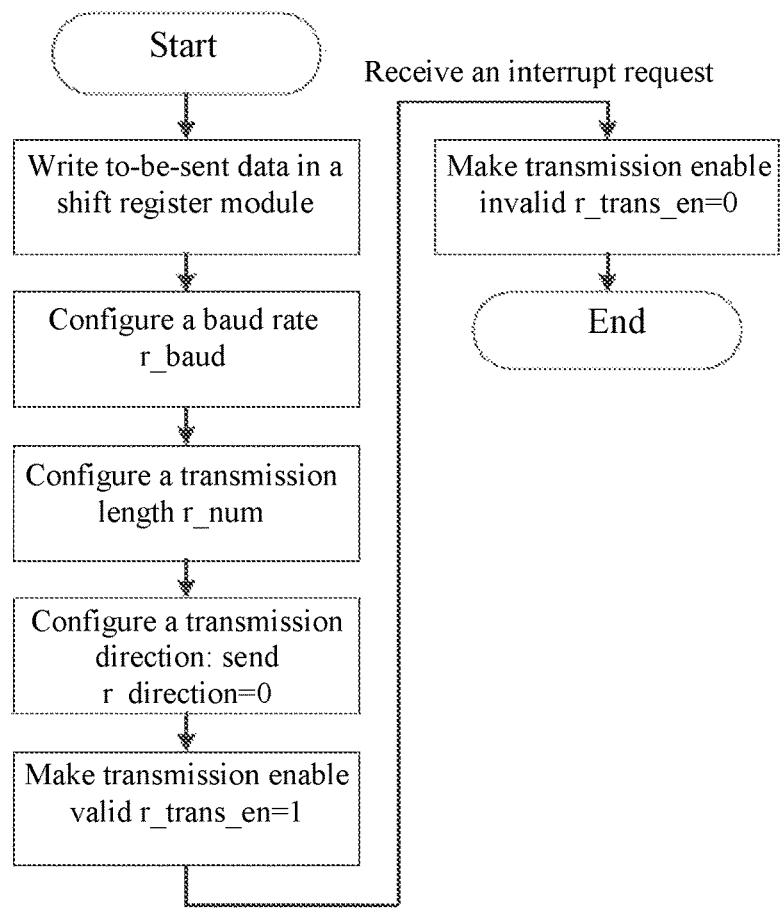
FIG. 9 is a flowchart showing an exemplary master machine implementing serial sending of data through a serial communication device, according to some embodiments of the present disclosure.

FIG. 9 is a flowchart showing an exemplary master machine implementing serial sending of data through a serial communication device, according to some embodiments of the present disclosure. The master machine first writes to-be-sent parallel data in a shift register module. The master machine can also set a baud rate (r_baud), a transmission length (r_num), and a transmission direction (r_direction), and can make transmission enable valid (e.g., r_trans_en=1). Then the master machine can release performance for other transactions. When the master machine receives an interrupt request sent by the serial communication device, the master machine can learn about the completion of data sending and make transmission enable invalid (e.g., r_trans_en=0), indicating that the data sending ends.

Figure 10:
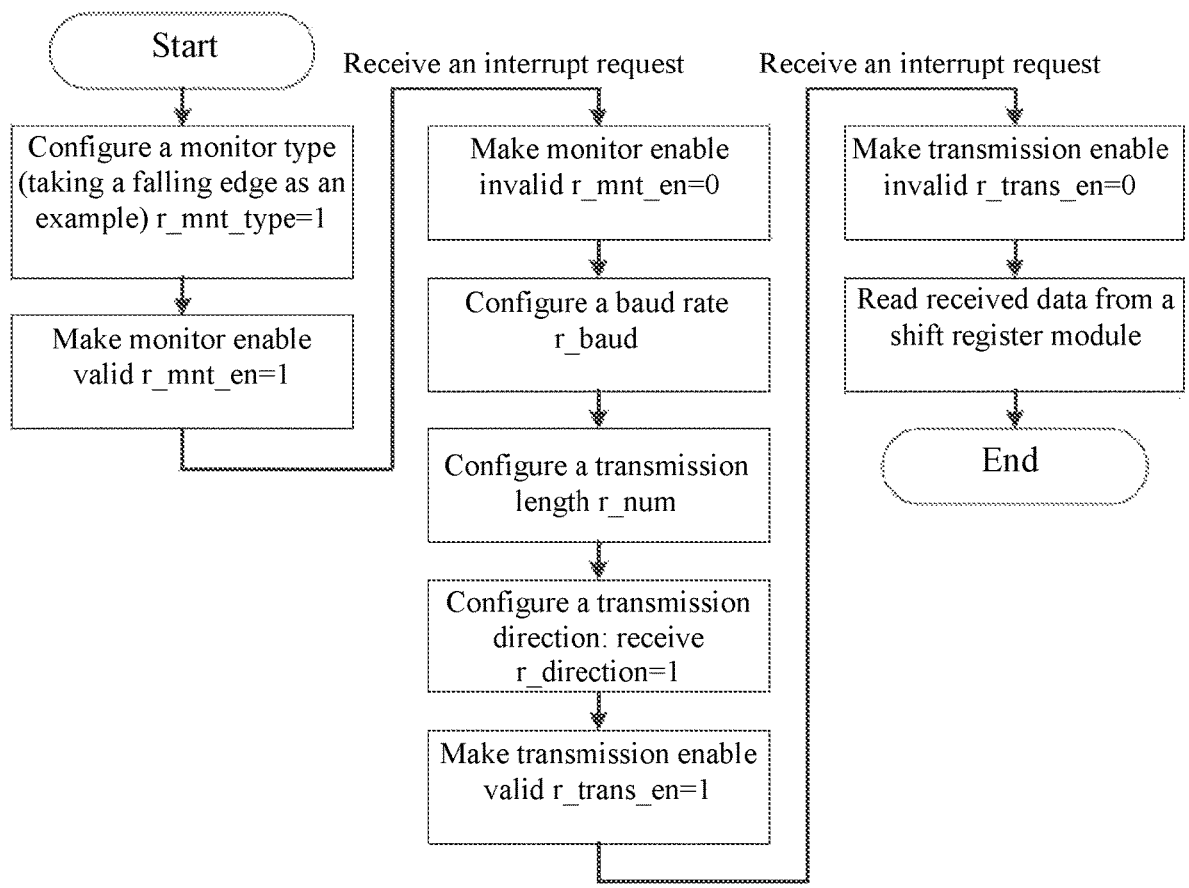
FIG. 10 is a flowchart showing an exemplary master machine implementing serial receiving of data through a serial communication device, according to some embodiments of the present disclosure.

FIG. 10 is a flowchart showing an exemplary master machine implementing serial receiving of data through a serial communication device, according to some embodiments of the present disclosure. The master machine first configures a monitor starting condition, e.g., configuring a monitor type to be a falling edge (e.g., r_mnt_type=1) and making monitor enable valid (e.g., r_mnt_en=1). The master machine can then be released for other transactions.

When the master machine receives an interrupt request sent by the serial communication device, the master machine can learn that a starting condition has been detected. The master machine can make monitor enable invalid (e.g., r_mnt_en=0), sets a baud rate (r_baud), a transmission length (r_num), and a transmission direction (r_direction). Moreover, the master machine can make transmission enable valid (e.g., r_trans_en=1). Afterwards, the master machine can be released for other transactions.

When the master machine receives an interrupt request sent by the serial communication device, the master machine can learn about completion of receiving data and make transmission enable invalid (e.g., r_trans_en=0). Finally, the master machine reads parallel data from the shift register module.

It is thus clear that the master machine reads data from and writes data to the slave machine using the serial communication device, and does not need to respond to frequent interrupt requests, therefore saving a large amount of resources.

Those with ordinary skill in the art would understand that all or a part of the procedures in the methods of the above embodiments can be implemented by a computer program instructing the relevant hardware. The program may be stored in a computer readable storage medium. When being executed, the program can include the procedures as described in the embodiments of the methods. The storage medium may be a magnetic disk, an optical disk, a Read-Only Memory (ROM), a Random Access Memory (RAM), or the like.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Specific implementations of the present disclosure are described above, but the protective scope of the present disclosure is not limited to the specific embodiment. Any modification, equivalent replacement and improvement made without departing from the spirit and principle of the present disclosure should fall within the protection scope of the present disclosure.

The invention claimed is:

1. A serial communication device, configured to implement data transmission between a master machine and a slave machine, comprising:
   a first interface circuitry communicatively coupled to an advanced bus of the master machine;
   a second interface circuitry communicatively coupled to a data interface of the slave machine;
   a control circuitry configured to acquire through the first interface circuitry control information sent by the master machine and to output a set of control signals based on the control information;
   a transceiving enable circuitry configured to generate a shift enable signal according to one or more control signals of the set of control signals;
   a shift register circuitry configured to:
      acquire through the first interface circuitry data sent by the master machine, serially shift out the data when the shift enable signal is valid, and send the serially shifted-out data to the slave machine through the second interface circuitry; and acquire through the second interface circuitry serial data uploaded by the slave machine, serially shift in the serial data when the shift enable signal is valid, obtain data according to the serially shifted-in data, and upload the obtained data to the master machine through the first interface circuitry; and an interrupt generating circuitry configured to generate an interrupt request signal according to one or more control signals of the set of control signals, the shift enable signal, and the serially shifted-in data, wherein the interrupt request signal notifies the master machine to resend the control information.

2. The serial communication device according to claim 1, wherein the set of control signals comprises a transmission enable signal, a transmission direction signal, a baud rate signal, a transmission length signal, a monitoring enable signal, and a monitoring type signal.

3. The serial communication device according to claim 2, wherein the transceiving enable circuitry generates the shift enable signal according to the transmission enable signal and the baud rate signal.

4. The serial communication device according to claim 1, wherein the shift register circuitry comprises a plurality of shift sub-circuitries that are connected in series, the plurality of shift sub-circuitries includes a first shift sub-circuitry, a last shift sub-circuitry, and any one or more intermediary shift sub-circuitries positioned between the first shift sub-circuitry and the last shift sub-circuitry.

5. The serial communication device according to claim 4, wherein: the first shift sub-circuitry is configured to receive the serially shifted-in data as input, and the last shift sub-circuitry is configured to output the serially shifted-out data.

6. The serial communication device according to claim 4, wherein each shift sub-circuitry of the plurality of shift sub-circuitries is configured to receive the shift enable signal as input to a first control, to receive a write enable signal as input to a second control, to receive one-bit of data to be written as input, and to output one-bit data of data to be read.

7. The serial communication device according to claim 5, wherein each shift sub-circuitry of the plurality of shift sub-circuitries comprises:
  a first multiplexer having a first input, a second input, a control, and an output,
  a second multiplexer having a first input, a second input connected to the output of the first multiplexer, a control, and an output, and
  a D flip-flop having an input connected to the output of the second multiplexer and an output connected to the first input of the first multiplexer.

8. The serial communication device according to claim 7, wherein:
  the first input of the first multiplexer of a shift sub-circuitry is connected to a first input of the shift sub-circuitry;
  the control of the first multiplexer is connected to the first control of the shift sub-circuitry;
  the second input of the second multiplexer is connected to a second input of the shift sub-circuitry;
  the control of the second multiplexer is connected to the second control of the shift sub-circuitry; and
  the output of the D flip-flop is connected to an output of the shift sub-circuitry.

9. The serial communication device according to claim 2, wherein the interrupt generating circuitry is configured to generate a transmission interrupt request signal according to the transmission enable signal, the shift enable signal, and the transmission length signal.

10. The serial communication device according to claim 9, wherein the interrupt generating circuitry is configured to generate the transmission interrupt request signal when the number of bits of the serially shifted-in data or the serially shifted-out data reaches a set transmission length according to the transmission length signal.

11. The serial communication device according to claim 9, wherein the interrupt generating circuitry is configured to generate a monitoring interrupt request signal according to the monitoring enable signal, the monitoring type signal, and the serially shifted-in data.

12. The serial communication device according to claim 11, wherein the interrupt generating circuitry is configured to generate the monitoring interrupt request signal when the serially shifted-in data or the serially shifted-out data has met a set of changing edge.

13. The serial communication device according to claim 11, wherein the interrupt generating circuitry is configured to generate the interrupt request signal by completing an OR operation on the transmission interrupt request signal and the monitoring interrupt request signal.

14. The serial communication device according to claim 2, wherein the second interface circuitry comprises an input unit and an output unit, wherein
  the input unit comprises two cascading D flip-flops and is configured to receive the serial data as input and to output the serially shifted-in data; and
  the output unit comprises a multiplexer and a D flip-flop, the first input end of the multiplexer inputs the serially shifted-out data, the control end of the multiplexer inputs the shift enable signal, the output end of the multiplexer is connected to the input end of the D flip-flop, the output end of the D flip-flop is connected to the second input end of the multiplexer, and the output end of the D flip-flop outputs serial data sent to the slave machine.

15. The serial communication device according to claim 2, wherein the second interface circuitry further comprises an output enable signal line configured to transmit an output enable signal, the output enable signal being obtained according to the transmission direction signal.

16. The serial communication device according to claim 1, wherein the advanced bus is an advanced peripheral bus (APB).

17. A method of implementing data transmission between a master machine and a slave machine, comprising:
  acquiring through a first interface module control information sent by a master machine coupled to an advanced bus;
  outputting a set of control signals based on the control information;
  generating a shift enable signal according to one or more control signals of the set of control signals;
  acquiring through the first interface module data sent by the master machine;
  serially shifting out the data in response to the shift enable signal being valid;
  sending the serially shifted-out data to a slave machine through a second interface module;
  acquiring through the second interface module serial data uploaded by the slave machine;
  serially shifting in the serial data in response to the shift enable signal being valid;
  obtaining data according to the serially shifted-in data;

uploading the obtained data to the master machine through the first interface module; and generating an interrupt request signal according to one or more control signals of the set of control signals, the shift enable signal, and the serially shifted-in data, wherein the interrupt request signal notifies the master machine to resend the control information.

18. The method according to claim 17, wherein the set of control signals comprises a transmission enable signal, a transmission direction signal, a baud rate signal, a transmission length signal, a monitoring enable signal, and a monitoring type signal.

19. The method according to claim 18, wherein generating the shift enable signal according to one or more control signals of the set of control signals further comprises generating the shift enable signal according to the transmission enable signal and the baud rate signal.

20. The method according to claim 18, wherein serially shifting out the data and serially shifting in the serial data involves using a plurality of shift submodules that are connected in series, the plurality of shift submodules including a first shift submodule, a last shift submodule, and any one or more intermediary shift submodules positioned between the first shift submodule and the last shift submodule.

21. The method according to claim 20, further comprising: receiving, at the first submodule, the serially shifted-in data as input, and outputting, at the last shift submodule, the serially shifted-out data.

22. The method according to claim 18, wherein generating an interrupt request signal further comprises generating a transmission interrupt request signal according to the transmission enable signal, the shift enable signal, and the transmission length signal.

23. The method according to claim 22, wherein generating an interrupt request signal further comprises generating the transmission interrupt request signal in response to the number of bits of the serially shifted-in data or the serially shifted-out data reaches a set transmission length according to the transmission length signal.

24. The method according to claim 22, wherein generating an interrupt request signal further comprises generating a monitoring interrupt request signal according to the monitoring enable signal, the monitoring type signal, and the serially shifted-in data.

25. The method according to claim 24, wherein generating an interrupt request signal further comprises generating the monitoring interrupt request signal when the serially shifted-in data or the serially shifted-out data has met a set of changing edge.

26. The method according to claim 24, wherein generating an interrupt request signal further comprises generating the interrupt request signal by completing an OR operation on the transmission interrupt request signal and the monitoring interrupt request signal.

* * * * *

UNITED STATES PATENT AND TRADEMARK OFFICE
CERTIFICATE OF CORRECTION

| | |
|---|---|
| PATENT NO. | : 10,922,263 B2 |
| APPLICATION NO. | : 16/479565 |
| DATED | : February 16, 2021 |
| INVENTOR(S) | : Mingkun Guo et al. |

It is certified that error appears in the above-identified patent and that said Letters Patent is hereby corrected as shown below:

On the Title Page

Item (73), in the Assignee, Line 2, "Zhejiang (CN)" should read --Hangzhou, Zhejiang (CN)--.

Item (30), in the Foreign Application Priority Data, "2017 1 1395761" should read --201711395761.1--.

In the Claims

In Claim 6, Column 9, Line 40, "one-bit data of data" should read --one-bit of data--.

Signed and Sealed this
Twentieth Day of February, 2024

Katherine Kelly Vidal
*Director of the United States Patent and Trademark Office*